US010546572B2

(12) United States Patent
Harne

(10) Patent No.: US 10,546,572 B2
(45) Date of Patent: Jan. 28, 2020

(54) FOLDED TRANSDUCER ARRAY FOR COMPACT AND DEPLOYABLE WAVE-ENERGY GUIDING SYSTEM

(71) Applicant: OHIO STATE INNOVATION FOUNDATION, Columbus, OH (US)

(72) Inventor: Ryan Lee Harne, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 362 days.

(21) Appl. No.: 15/461,887

(22) Filed: Mar. 17, 2017

(65) Prior Publication Data

US 2017/0269188 A1 Sep. 21, 2017

Related U.S. Application Data

(60) Provisional application No. 62/309,621, filed on Mar. 17, 2016.

(51) Int. Cl.
*G01S 3/805* (2006.01)
*G10K 11/32* (2006.01)

(52) U.S. Cl.
CPC .................................... *G10K 11/32* (2013.01)

(58) Field of Classification Search
CPC ...................................................... G10K 11/32
USPC ........................................................... 367/120
See application file for complete search history.

(56) References Cited

U.S. PATENT DOCUMENTS 7,245,729 B2 * 7/2007 Bank ...................... H04R 1/025 381/152
2007/0066902 A1 * 3/2007 Wilser ..................... A61B 8/12 600/459

OTHER PUBLICATIONS

Fuchi et al., "Resonance Tuning of Devices through Origami Folding," 20th International Conference on Composite Materials, Copenhagen, Jul. 19-24, 2015, 10 pages. (Year: 2015).*

* cited by examiner

*Primary Examiner* — Daniel L Murphy
(74) *Attorney, Agent, or Firm* — Michael Best & Friedrich LLP

(57) ABSTRACT

A wave energy guiding system is described that includes a structural substrate formed according to a folded-pattern topology including, for example, an origami-type folded-pattern topology such as Miura-ori. The structural substrate includes a plurality of planar facets each positionable at an angle relative to adjacent planar facets. Each transducer of the plurality of transducers is positioned on a different one of the plurality of planar facets to form a transducer array. Adjustments to the angle of the adjacent planar facets cause a corresponding adjustment to a performance characteristic of the transducer array. In this way, the performance of the wave-energy guiding system can be adjusted and modified by adjusting the degree to which the structural substrate is folded in the folded-pattern topology.

17 Claims, 8 Drawing Sheets

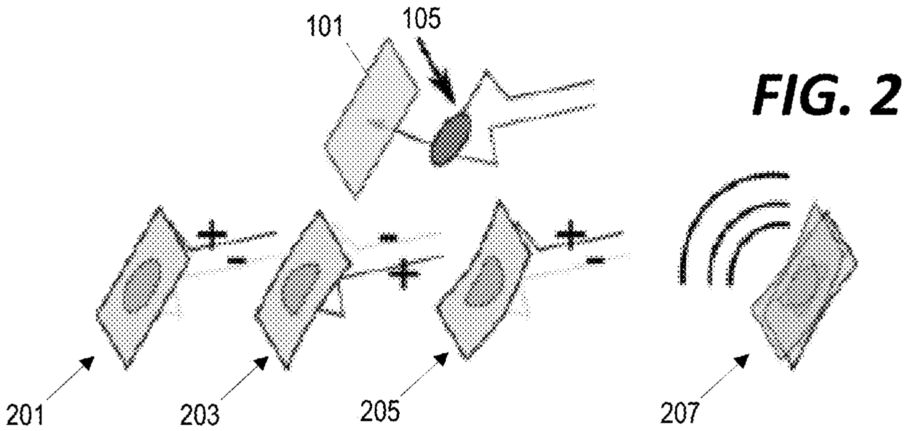
FIG. 2
FIG. 3
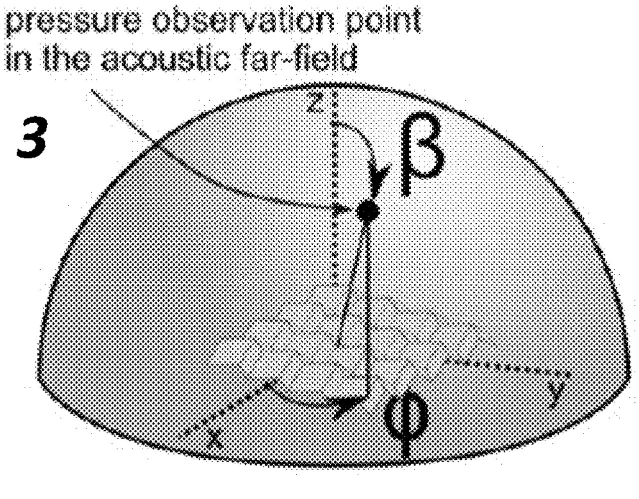

FOLDED TRANSDUCER ARRAY FOR COMPACT AND DEPLOYABLE WAVE-ENERGY GUIDING SYSTEM

RELATED APPLICATIONS

This application claims the benefit of U.S. Provisional Patent Application No. 62/309,621, filed Mar. 17, 2016, entitled "FOLDED TRANSDUCER ARRAY FOR COMPACT AND DEPLOYABLE WAVE-ENERGY GUIDING SYSTEM," the entire contents of which are incorporated herein by reference.

BACKGROUND

The present invention relates to systems and methods for guiding and steering wave-energy radiation and reception sensitivities such as, for example, to propagate acoustic waves. Fundamentally, "point" acoustic sources radiate sound equally in all directions and, by acoustic reciprocity, point acoustic receivers are equally sensitive to incoming sound from all directions. Arrays of acoustic sources/receivers can be implemented to substantially enhance directional and spectral sensitivities. Some systems implement "phase delays" to control spatial distribution of incoming/outgoing signals. In particular, some systems use techniques such as "beamforming" to create and steer acoustic energy by active delays.

SUMMARY

Although beamforming systems that are based on phase delays can be used to enhance directional and spectral sensitivities, each source or receiver must be individually controlled by appropriate phase delays to guide the acoustic energy radiation/reception sensitivities. This results in a massive computational burden in order to realize intense confinement of acoustic waves in angular regions or focusing at specific spatial locations, particularly at high frequencies. The spatial distribution in such systems may also result in physically large platforms that may be ill-suited for mobile applications that demand compacted platforms for transport thereafter deployed for utilization. As a consequence, implementation complexity increases in proportion to sensitivity while portability is also severely compromised.

Various embodiments described below reduce these negative effects by using structural topology to enhance directional and spectral sensitivities instead of using phase delay. In some embodiments, origami-based engineering design techniques are applied to provide exceptional versatility and adaptable performance. The resulting systems can be made compact and selectively deployable. The Origami-type folded structure provides periodic patterns of planar facets and acoustic arrays are composed from transducers positioned on the planar elements, all together driven by one or few signals. Simple kinematic and mechanic transformations of the folding array topology therefore govern the directional and spectral sensitivities for wave energy guiding and steering, in contrast to a multitude of individually controlled signals sent or received from a spatially-fixed, conventional array of acoustic sources/receivers.

In one embodiment, the invention provides a wave energy guiding system that includes a structural substrate formed according to a folded-pattern topology and a plurality of transducers. The structural substrate includes a plurality of planar facets each positionable at an angle relative to adjacent planar facets. Each transducer of the plurality of transducers is positioned on a different one of the plurality of planar facets to form a transducer array. Adjustments to the angle of the adjacent planar facets cause a corresponding adjustment to a performance characteristic of the transducer array. In this way, the performance of the wave-energy guiding system can be adjusted and modified by adjusting the degree to which the structural substrate is folded in the folded-pattern topology.

In some embodiments, the folded topology of the structural substrate is in the form of a "Miura-ori" folding pattern. When used as the structural substrate, other folding topologies, sometimes termed "tessellations", provide unique influences upon the directional and spectral sensitivities of wave propagation/reception. In all such folding topologies, the relative angles of the folded faces of the structural substrate can be increased or decreased to adjust or regulate the resultant wave guidance provided by the system.

In some embodiments, the system further includes actuation mechanisms to controllably fold and un-fold the structural substrate to provide tunable changes in functionality. As such, the spatial and spectral sensitivities of the system can be tuned and steered by simple reconfigurations of the foldable transducer array. Because the topology controls the sensitivities of the system, only a single "drive" signal is required to actuate all of the transducer elements positioned on each of the planar facets. Furthermore, in some embodiments, the substrate can include flat-foldable patterns such that the substrate can be fully folded and compacted for significant advances in portability.

In various embodiments, the wave-energy guiding systems described herein can be used for long-range communications and targeted announcement systems (e.g., microphone or loudspeaker arrays). They may also be implemented as force projection systems (e.g. non-lethal force at macroscale or for lithotripsy procedures at micro/mesoscales), biomedical imaging systems, industrial monitoring systems, and cleaning systems (e.g., ultrasonic applications).

Other aspects of the invention will become apparent by consideration of the detailed description and accompanying drawings.

BRIEF DESCRIPTION OF THE DRAWINGS

FIG. 2 is a schematic diagram of the actuation of an individual transducer element of the transducer array of FIG. 1A.

FIG. 3 is a schematic diagram of the transducer array of FIG. 1A providing directivity notation in the far-field showing elevation and azimuth angles.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
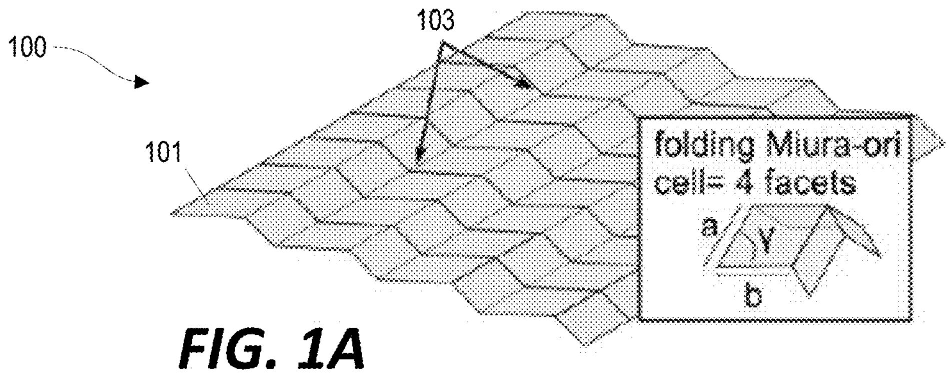
FIG. 1A is a perspective view of a foldable transducer array in an unfolded state.
Figure 1B:
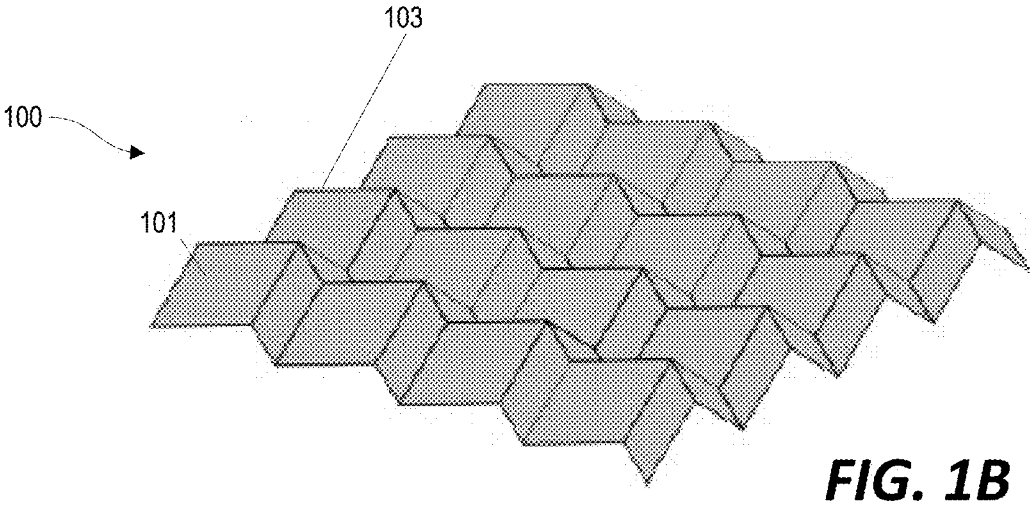
FIG. 1B is a perspective view of the transducer array of FIG. 1A in a partially-folded state.
Figure 1C:
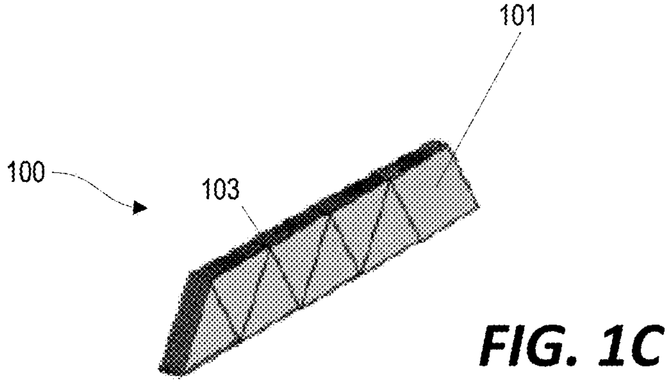
FIG. 1C is a perspective view of the transducer array of FIG. 1A in a fully-folded state.

FIG. 1A illustrates a first example of a foldable transducer array 100 in a nearly unfolded state. The foldable transducer array 100 includes a plurality of parallelogram (or rhombus) shaped facets 101 each separated by a folding line 103. In FIG. 1A, the unfolded array topology is exemplified using a conventional "Miura-ori" folding pattern. As the transducer array 100 is folded along the folding lines, the array topology can be adjusted to various degrees including, for example, a partially folded state as illustrated in FIG. 1B and a completely folded state as illustrated in FIG. 1C. The degree of folding (e.g., in the partially folded state) can be modified and adjusted to control and tune the wave energy guiding capabilities of the transducer array 100. The completely folded state of FIG. 1C can be used for easy storage and/or transportation of the transducer array 100.

Although the example of FIGS. 1A through 1C illustrate a foldable transducer array 100 using the Miura-ori folding pattern, other implementations may utilize other folding patterns including, for example, the "corrugated" or "accordion" style, "origami pyramid", "eggbox", and so forth. Different folding patterns lead to different wave energy guiding capabilities for the proposed, foldable transducer array.

Electromechanical transducers are bonded to one side of the folded array at a desired number of array facets (individual structural faces, or panes). For example, FIG. 2 illustrates an implementation where a piezoelectric disc 105 is bonded to one side of a folded array facet 101. In some implementations, one or more transducers 105 are bonded to each facet. However, in the examples discussed below, one transduce is provided for each facet and all transducer elements of a given array are driven in parallel (i.e., with the same signal). The transducer 105 is actuated by alternating voltage signals causing the piezoelectric disc to bend which, in turn, leads to bending of the folded facet. FIG. 2 shows the facet 201 in a flat state 201, an outwardly bent state 204, and an inwardly bent state 205. By applying an alternatively voltage to the transducer 105 in this way, each facet 101 of the transducer array generates an acoustic wave (as illustrated in 207). This in turn leads to acoustic wave propagation from the folded array due to structure-fluid coupling between the array structural dynamics and the ambient fluid surrounding the array. Depending on the embodiment and application, the waves may be at acoustic frequencies (such as in air) or at ultrasonic frequencies (such as in biomedical ultrasound applications).

The periodic, foldable array topology is the key to the energy focusing and guiding capabilities. Arrays of wave-propagation elements typically lead to confined "directivity", which is a measure of the localization of wave energy to particular directions (measured as elevation and azimuth directions). Directivity of arrays is strongly governed by the number of transducers and their spatial arrangement relative to another. Thus from an observing perspective removed to the "far-field", there will be substantial variation in the intensity of the energy transmitted from the array to certain locations in space depending on the elevation β and azimuth angles ϕ of the radiation plane[s], as depicted in FIG. 3.

Figure 4A:
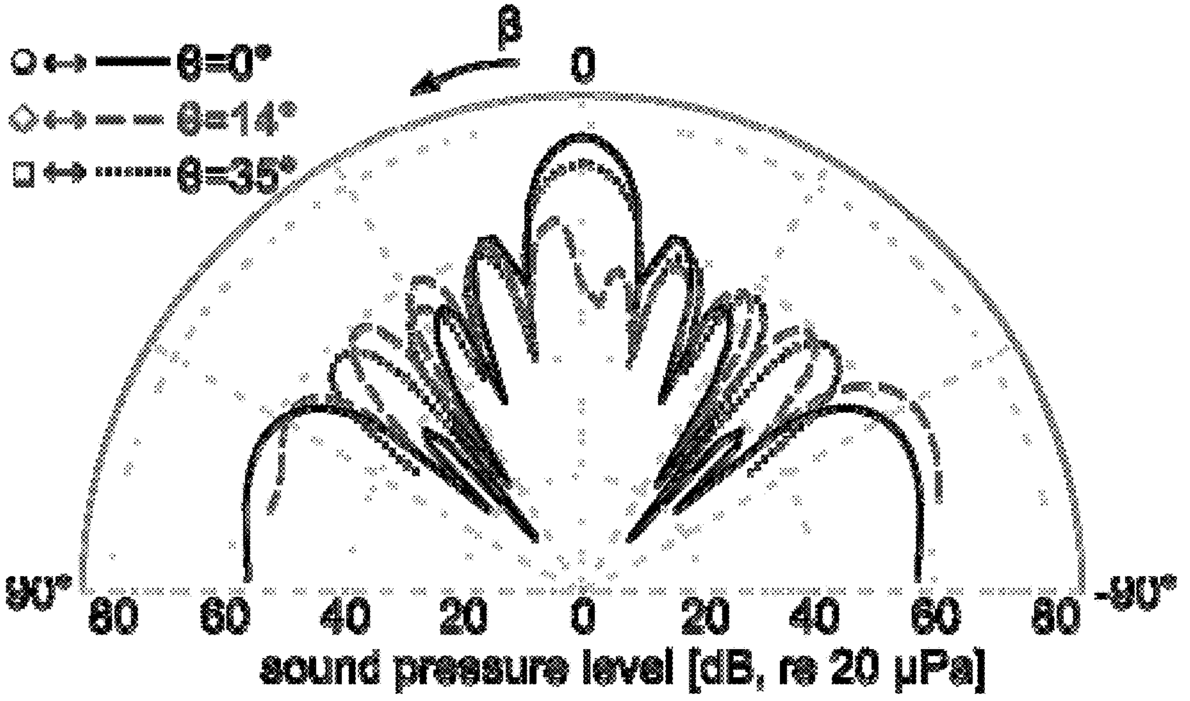
FIG. 4A is a graph of the wave-energy directivity of the transducer array of FIG. 1A.
Figure 4B:
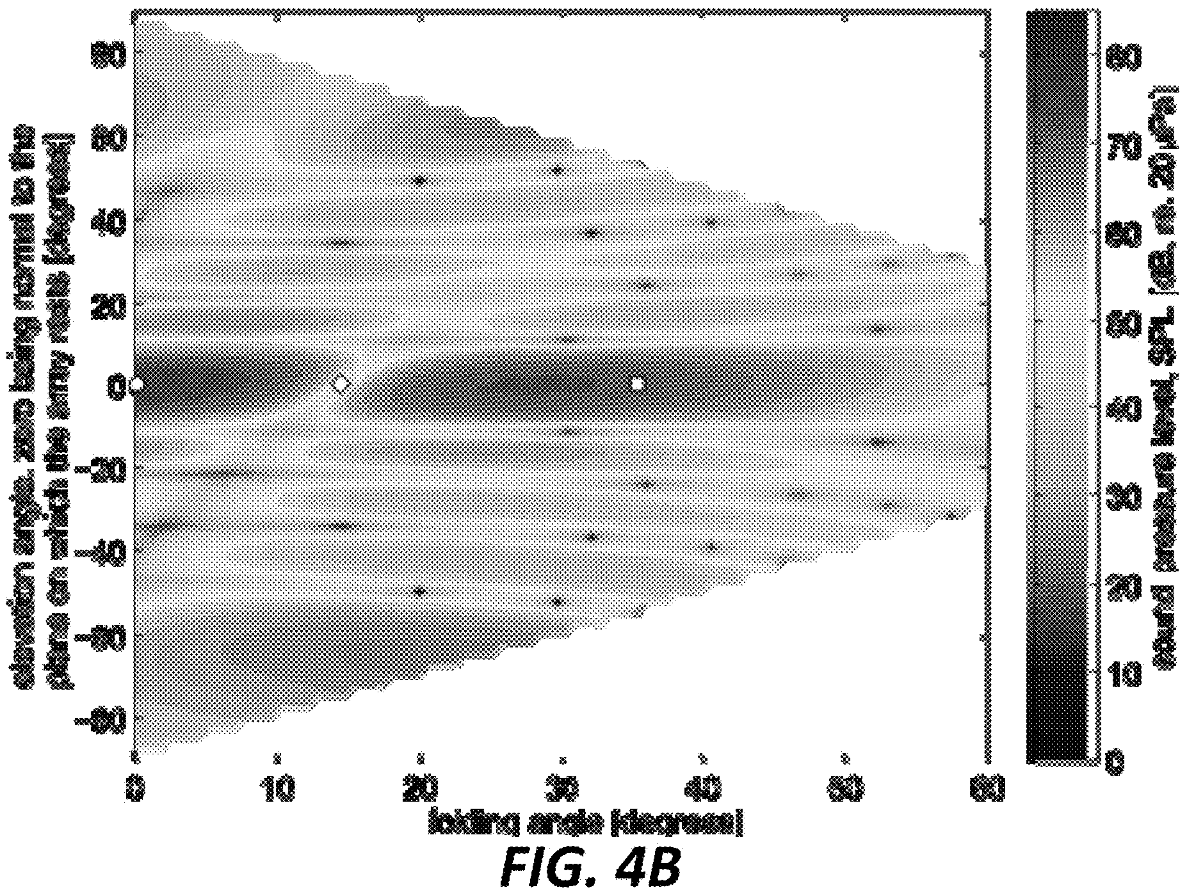
FIG. 4B is a contour-plot graph of the acoustic wave energy transmission predicted using an analytical model as the transducer array transitions from an unfolded state (i.e., 0 degrees) to a folded state (approximately 60 degrees).

FIG. 4A illustrates the wave energy directivity of transducer array composed from 5×4 Miura-ori folding cells, where a cell is depicted in FIG. 1A. Here, the fluid is air and the frequency of the array excitation is 8 kHz. These results in FIG. 4A, computed from an analytical model and validated through direct simulations, indicate substantial sensitivity of the wave energy propagation based on the elevation angle. The plots show the directivity for azimuth of ϕ=0 degrees while the polar rotation angle is the change in elevation angle β. As the array is folded together, the dashed line plot in FIG. 4A shows that a folding angle of 14 degrees leads to a substantial reduction in the intensity propagated from the array to the far-field at the "broadside" condition (that is β=0 degrees) when compared to the unfolded array (the solid line plot in FIG. 4A). Specifically, a 36 dB decrease in the radiated acoustic pressure is received at the broadside location due to the 20 degree change in the array folding. This is approximately 10,000 times decrease in the transmitted acoustic power. Moreover, by then folding the array to an angle of 35 degrees, the dotted line plot in FIG. 4A shows that the sound pressure level is raised back up by 31 dB from that transmitted at the fold angle of 14 degrees. Thus, these results show that tremendous wave energy may be strategically concentrated via the design and folding of the transducer array. Considering the same array and the same 8 kHz frequency, FIG. 4B presents a contour plot of the acoustic wave energy transmission predicted using the analytical model from the unfolded (θ=0 degrees) to the very folded (θ=60 degrees) configurations, showing that the broadside (β=0 degrees) sound pressure level is substantially reduced around the fold angle θ=14 degrees. In the FIG. 4B, the azimuth angle of ϕ=0 degrees is likewise considered.

Figure 5:
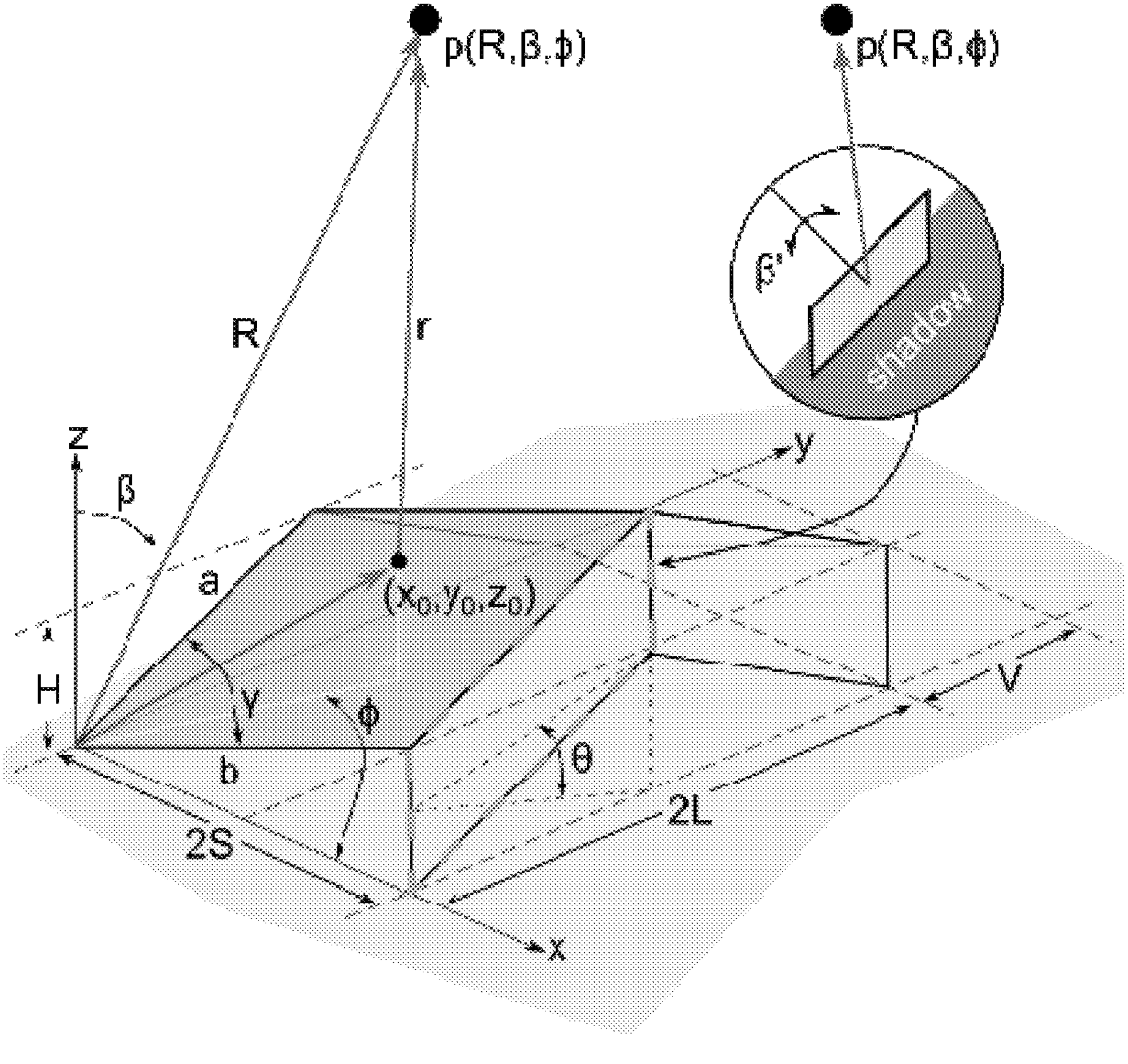
FIG. 5 is a detailed perspective view of a portion of the transducer array of FIG. 1A illustrating the relative angles and measures used to predict sound pressure levels.

In order to demonstrate the analytical model discussed above, FIG. 5 illustrates a part of the transducer array in further detail. The analytical model predicts the radiation of sound from vibrating parallelogram surfaces distributed according to the Miura-ori fold pattern. To solve Rayleigh's integral:

$$p(R, \beta, \phi, t) = j\frac{\rho_0 \omega u_0}{2\pi} e^{j\omega t} \int_A \frac{e^{-jkr}}{r} dA \tag{1}$$

in closed form, constraints are imposed to omit results that correspond to physical situations with acoustic shadows. In the solution approach, the focus is on predicting the sound pressure in the acoustic far field with respect to the source/receiver locations and the acoustic wavelength. Once computed from the Rayleigh's integral in this way, sound pressure levels are determined by the equation:

$$SPL = 20\log_{10}\left[\frac{p(R, \beta, \phi, t)}{p_{ref}}\right]; \; p_{ref} = 20\ \mu\text{Pa} \tag{2}$$

As demonstrated in the examples of FIGS. 4A and 4B, as the array is folded, a significant change in the transmission of acoustic energy to the far-field point results. Locations of the side lobes are altered and the peak of the major lobe is impacted providing asymmetric results. This is, at least in part, because the Miura-ori cell pattern does not possess acoustic symmetry. A full evolution of the trends reveals that a partially folded array (e.g., θ=14 degrees) diminishes SPL at broadside β=0, while the more folded array θ=30 to 35 degrees will raise SPL back up in a technique referred to herein as "energy pumping."

The substrate can be formed in a variety of techniques and materials. For example, cardstock or polymer sheets may be scored in the Miura-ori fold pattern using a laser cutter for ease of folding the tessellation properly. Other possible materials include, for example, polypropylene, polyethylene, and nylon. In some implementations, polypropylene performs particularly well as it does not melt or vulcanize under laser cutting and does not fracture once folded due to material brittleness.

Although the specific electronic components of the transducer array may vary in particular applications, in the examples discussed above, the electronics include piezoelectric PVDF or PZT adhered to a set number of Miura-ori cells. All of the transducers are wired in parallel and a drive signal is provided by a function generator and fed first to an active amplifier, then to a passive transformer, and finally to the baffled specimen. In the experimental examples described above, radiated acoustic pressure was measured in a semi-anechoic chamber over a portion of the hemisphere.

Figure 6A:
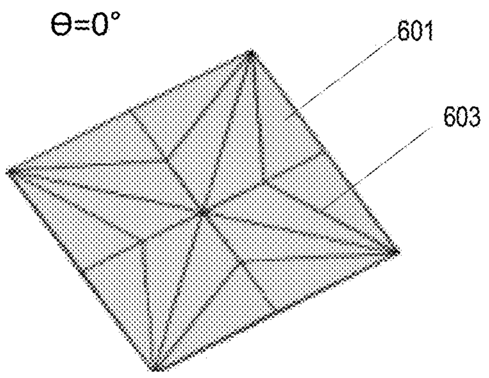
FIGS. 6A, 6B, and 6C are perspective views of another example of a foldable transducer arrays at various different degrees of folding.
Figure 6B:
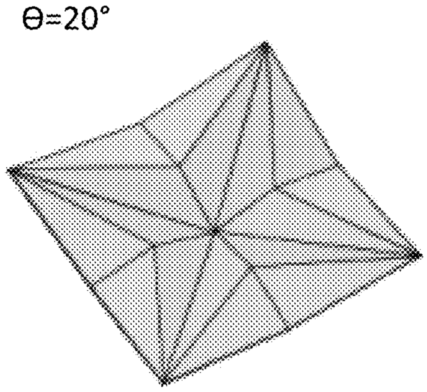
Figure 6C:
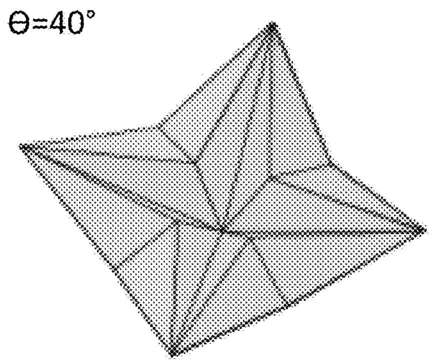

Although the examples discussed and illustrated above focus primarily on the Miura-ori folding pattern, other implementations may utilize other folding topologies. FIGS. 6A, 6B, and 6C illustrate another example of a foldable transducer array in which each facet 601 is formed in a triangular shape. The facets 601 are again separated from each other by folding lines 603. By folding the transducer array along the folding lines 603, the transducer array can be adjusted into a variety of folding degrees. FIG. 6A shows this sensor array in an unfolded state (θ=0°) while FIG. 6B shows the same sensor array folded to an angle of 20° between the facets. Finally, FIG. 6C again shows the same sensor array folded to an even larger degree (θ=40°).

Figure 7:
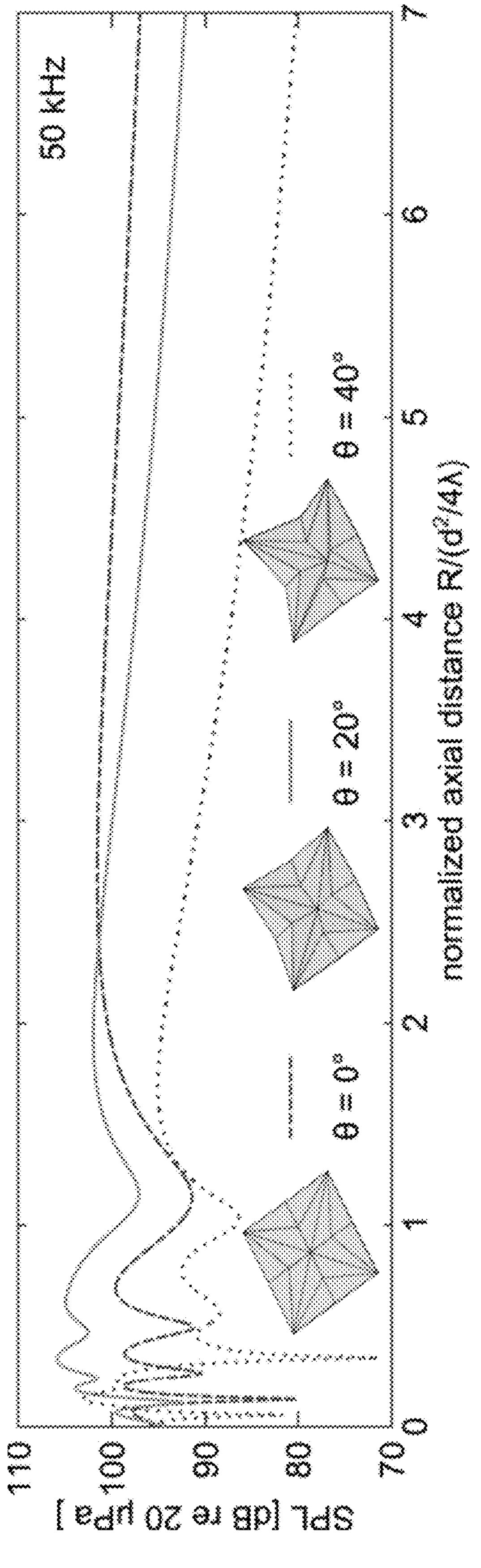
FIG. 7 is a graph of near field focusing for the transducer array of FIGS. 6A, 6B, and 6C at different folding degrees.

FIG. 7 illustrates another example of how adjusting the degree of folding of the transducer array can affect the performance of the transducer array. In particular, FIG. 7 plots the sound pressure level ("SPL") measured in dB at various axial distances using the three different folding degrees illustrated in FIGS. 6A, 6B, and 6C. The graphs of FIG. 7 demonstrate how adjusting the folding pattern of the transducer array can significantly impact near field focusing. For example, at a normalized axial distance of approximately 0.25, there is a difference of approximately 30 dB in the sound pressure provided by a transducer array folded at 20° (e.g., as in FIG. 6B) and the same transducer array folded at 40° (e.g., as in FIG. 6C). Accordingly, while "directive" sources are usually planar and "focusing" sources usually require curvature, the foldable transducer arrays are configured to controllably adjust both directivity and focusing using a single transducer array.

Figure 8:
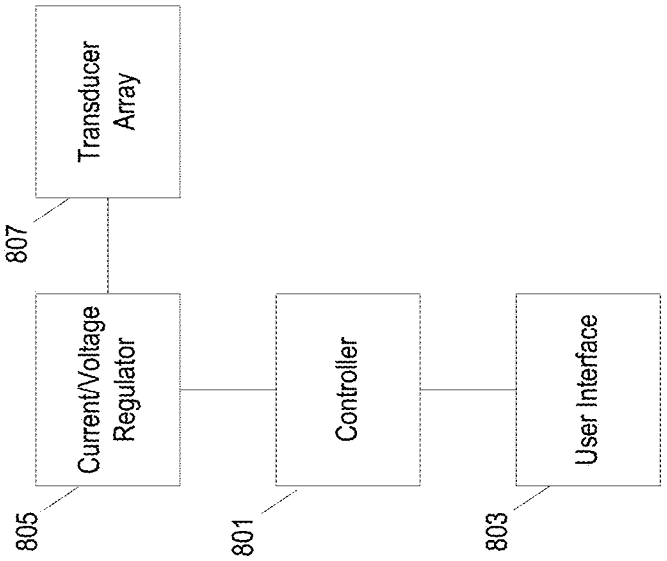
FIG. 8 is a block diagram of a first example of a control system for the foldable transducer array of FIG. 1A or FIG. 3A.

The control systems for the foldable transducer arrays can be adjusted to provide various different types and degrees of control over the transducer array device. For example, FIG. 8 illustrates one control system that includes a controller 801, a user interface 803, and a current/voltage regulator 805. The controller 801 receives an input from the user interface 803—this input can be as simple as an "on" button or a dial that can be used to adjust a setting of the transducer array (e.g., amplitude and or frequency of transducer oscillation). Based on the input signal from the user interface 803, the controller 801 causes the current/voltage regulator 805 to provide a controlled alternating voltage to each facet of the transducer array 807. In some implementations, the controller 801 includes an electronic processor that is configured to execute instructions that, in turn, cause the electronic processor to provide control signals to the current/voltage regulator. In still other embodiments, the controller 801 includes an analog or digital circuit that is configured to activate the current/voltage regulator 805.

Figure 9:
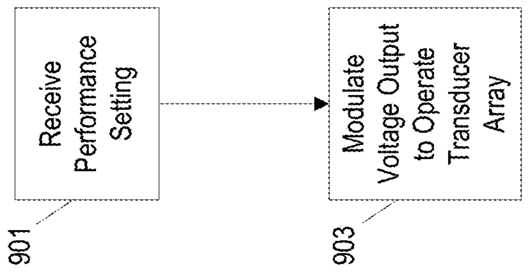
FIG. 9 is a flowchart of a method for operating the transducer array using the control system of FIG. 8.

FIG. 9 illustrates a method of operating the transducer array using the control system of FIG. 8. A performance setting is received by the controller 801 from the user interface 803 (step 901) and, in turn, the controller 801 modulates the voltage output from the current/voltage regulator 805 to operate the transducer array 807 (step 903). In some implementations, the "performance setting" received from the user interface can be a setting defining an operational variable such as, for example, a frequency and/or amplitude. In other implementations, the frequency and/or amplitude of the transducer array oscillation may be predefined by coding or by the circuit itself and, accordingly, the "performance setting" received from the user interface is simply a signal indicating that the oscillation is to begin (e.g., an "on" button).

Figure 10:
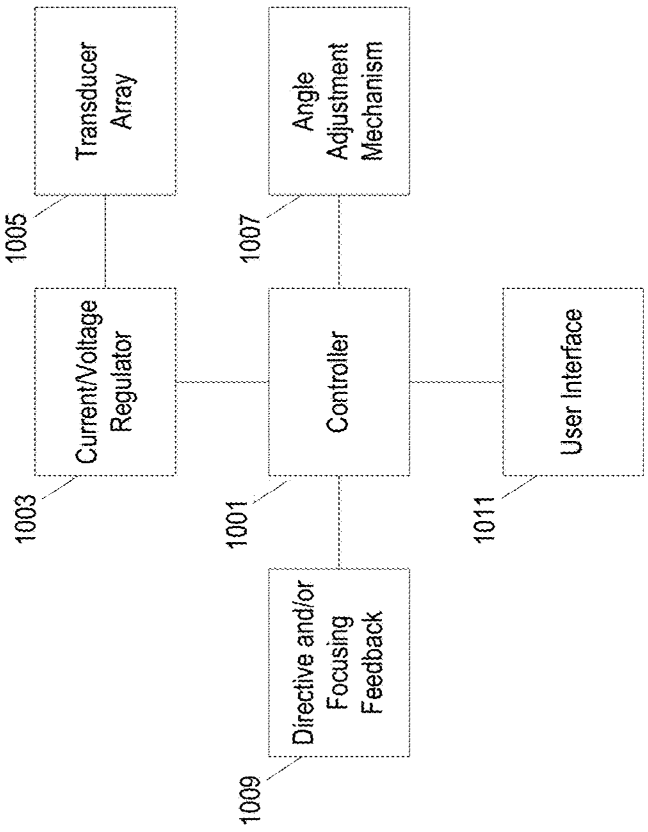
FIG. 10 is a block diagram of a second example of a control system for the foldable transducer array of FIG. 1A or FIG. 3A.

Although the control system of FIG. 8 and the method of FIG. 9 illustrate one example, other implementation may include additional, more advanced control functionality. In the example of FIG. 10, the control system includes a controller 1001 and a voltage regulator 1003 for controlling the oscillation of the transducers in the transducer array 1005. However, the control system of FIG. 10 also includes an angle adjustment mechanism 1007 and directive and/or focusing feedback 1009. The control system of FIG. 10 also includes a user interface 1011.

In some implementations, the degree to which the foldable transducer array is folded controlled manually be the user—the user manually pulls or pushes the foldable transducer array into a desired folded position. However, in other implementations, as in the example of FIG. 10, an angle adjustment mechanism 1007 is configured to automatically adjust the foldable transducer array to the desired folding position. In some examples, the angle adjustment mechanism includes a motorized mechanism configured to pull various parts of the transducer array causing the degree of folding of the array to increase.

In other implementations, the foldable transducer array is formed using "shape memory" materials. Shape memory materials are heat or light responsive such that, when exposed to a specific degree of heat or light, the atoms realign causing the material to conform to a specific shape. In some such implementations, the angle adjustment mechanism 1007 may include a current regulator and resistive heating wires positioned in or adjacent to the surface material of the transducer array. When a current is applied to the resistive heating wires, heat is generated causing the shape memory material to fold the transducer array to a desired position. In some implementations, the shape memory material is configured to react differently to different intensities of heat. Accordingly, the angle adjustment mechanism 1007 is configured to apply a first current to the resistive heating wires which generates a first heat intensity and causes the transducer array to fold to a first position, and then applies a second current to the resistive heating wires which generates a second heat intensity and causes the transducer array to fold to a second position.

The user interface 1011 can also be provided in various different forms and configurations in different implementations. For example, the user interface 1011 may include one or more dials or switches coupled to the transducer array and configured to adjust the amplitude and/or frequency of the oscillation of the transducers and to adjust the degree of folding of the transducer array. In other implementations, the user interface may be provided as a graphical user interface displayed, for example, on a smart phone, tablet computer, or desktop computer.

Figure 11:
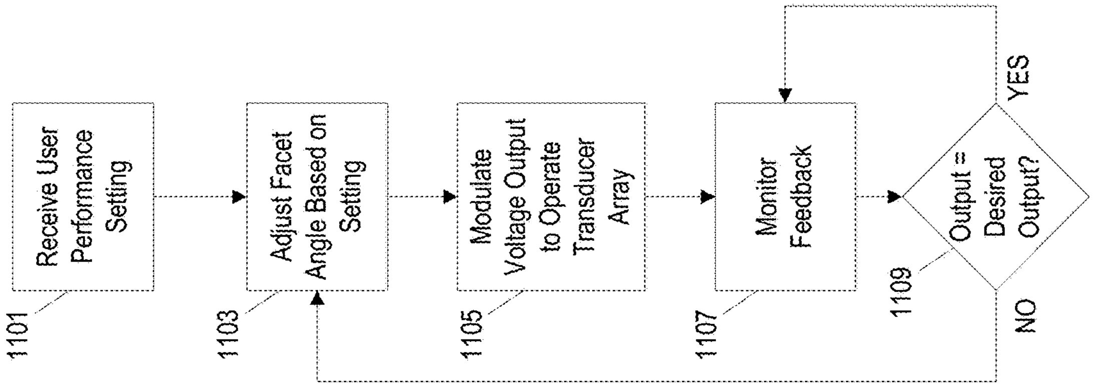
FIG. 11 is a flowchart of a method for operating the transducer array using the control system of FIG. 10.

FIG. 11 illustrates one example of a method for operating the transducer array using the control system of FIG. 10. Again, the controller 1001 receives user performance settings from the user interface (step 1101). The controller 1001 then provides a signal to the angle adjustment mechanism 1007 to adjust the facet angle of the transducer array based on the performance settings (step 1103). Once the transducer array is folded to the appropriate degree, the controller 1001 sends a signal to the current/voltage regulator 1003 causing it to operate the transducers in the transducer array by modulate the voltage applied to each transducer (step 1105). In implementations that are configured with a directive and/or focusing feedback module 1009 (e.g., one or more microphones positioned on or around the transducer array), the controller 1001 receives and monitors a feedback signal (step 1107) and determines whether the performance output of the transducer array matches the desired performance output (step 1109). If so, the system continues to operate while periodically monitoring the feedback (step 1107). However, if the actual performance output does not match the desired performance output, the controller 1001 is configured to make appropriate adjustments to the facet angle (step 1103) or to the voltage applied to the transducers (step 1105) until the performance output does match the desired performance output.

In the examples discussed above, an individual transducer is coupled to an individual corresponding planar facet of the structural substrate. However, in other implementations, a single transducer—for example, a PVDF film transducer—is configured to cover the surface of the structural substrate across multiple different planar facets. In some such implementations, the PVDF film is laser cut and perforated into the desired shape.

Potential applications of this technology include orbital space and military missions where wave energy guiding and steering are needed for antennae and force-distribution purposes. Additionally, biomedical applications regularly employ energy-concentrating devices and oftentimes have strict demands on transducer size prior to their deployment at the point-of-care. Thus, the proposed technology may benefit ultrasonic energy guiding applications, such as for lithotripsy operations.

Thus, the invention provides, among other things, a transducer array configured in a folded or, in some implementations, controllably foldable structural topology wherein spatial and spectral sensitivities are controlled by the angle of the folded topology. Various features and advantages of the invention are set forth in the following claims.

What is claimed is:

1. A wave-energy guiding system comprising:

a structural substrate formed according to a folded-pattern topology, the structural substrate including a plurality of planar facets each coordinatedly positionable at an adjustable angle relative to adjacent planar facets, wherein an adjustment of the adjustable angle between two adjacent planar facets causes a corresponding adjustment of the adjustable angle between two other adjacent planar facets; and a plurality of transducers each coupled to a different planar facet of the plurality of planar facets of the structural substrate, wherein the folded-pattern topology and positioning of the plurality of transducers on the plurality of planar facets is configured to cause adjustments to a degree of folding of the structural substrate in the folded-pattern topology to produce a corresponding adjustment in a directional characteristic and a focusing characteristic of the wave-energy guiding system.

2. The wave-energy guiding system of claim 1, further comprising a drive signal generator configured to provide a single, in-phase drive signal to all transducers of the plurality of transducers regardless of the degree of folding of the structural substrate.

3. The wave-energy guiding system of claim 2, wherein each transducer of the plurality of transducers includes a piezoelectric element that vibrates to generate a wave output in response to the drive signal from the drive signal generator.

4. The wave-energy guiding system of claim 1, wherein the structural substrate includes a compliant, folded material such that a degree of the angles can be selectively adjusted to adjust spatial and spectral sensitivities of the wave-energy guiding system.

5. The wave-energy guiding system of claim 1, further comprising an adjustment mechanism configured to controllably adjust the angles of the structural substrate in response to a user-initiated input.

6. The wave-energy guiding system of claim 1, wherein the folded-pattern topology of the structural substrate includes a Miura-ori folding pattern.

7. The wave-energy guiding system of claim 1, wherein the adjustment in the directional characteristic of the wave-energy guiding system includes an adjustment to an acoustic pressure generated by the wave-energy guiding system at an elevation angle relative to an orthogonal axis of the wave-energy guiding system, and wherein the adjustment in the focusing characteristic includes an adjustment to the acoustic pressure generated by the wave-energy guiding system at an axial distance relative to the wave-energy guiding system.

8. A method of operating a wave-energy guiding system, the wave energy guiding system including a structural substrate formed according to a folded-pattern topology and including a plurality of planar facets each positionable at an adjustable angle relative to adjacent planar facets, and a plurality of transducers each positioned at a different one of the plurality of planar facets forming a transducer array, the method comprising:

adjusting a directional characteristic and a focusing characteristic of the transducer array by adjusting an angle between the adjacent planar facets to adjust a degree to which the structural substrate is folded in the folded-pattern topology.

9. The method of claim 8, further comprising applying an alternating voltage to each of the transducers of the plurality of transducers, wherein the alternating voltage causes the transducer to oscillate a surface of a corresponding planar facet.

10. The method of claim 9, wherein applying the alternating voltage to each of the transducers of the plurality of transducers includes applying a single, in-phase drive signal to all of the transducers of the plurality of transducers.

11. The method of claim 9, wherein applying the alternating voltage to each of the transducers of the plurality of transducers includes applying the alternating voltage to a piezoelectric element coupled to the corresponding planar facet, wherein the alternating voltage causes vibration of the piezoelectric element which, in turn, causes the surface of the corresponding planar facet to oscillate.

12. The method of claim 8, wherein adjusting the angle between the adjacent planar facets in the folded-pattern topology includes adjusting the angle between adjacent planar facets in the structural substrate formed of a compliant, folded material.

13. The method of claim 8, wherein adjusting the angle between the adjacent planar facets also causes an adjustment of spatial and spectral sensitivities of the transducer array.

14. The method of claim 8, wherein adjusting the angle between the adjacent planar facets in the folded-pattern topology includes receiving, by a controller, a user-initiated input; and operating, by the controller, an adjustment mechanism configured to controllably adjust the degree to which the structural substrate is folded in the folded-pattern topology in response to the user-initiated input.

15. The method of claim 8, wherein adjusting the angle between the adjacent planar facets in the folded-pattern topology includes adjusting the degree to which the structural substrate is folded in accordance with a Miura-ori folding pattern.

16. The method of claim 8, further comprising folding the structural substrate to a fully folded state according to the folded-pattern topology for storage or transport of the wave-energy guiding system.

17. The method of claim 8, wherein adjusting the directional characteristic of the transducer array includes adjusting an acoustic pressure generated by the transducer array at an elevation angle relative to an orthogonal axis of the transducer array, and wherein adjusting the focusing characteristic of the transducer array includes adjusting an acoustic pressure generated by the transducer array at an axial distance relative to the transducer array.

* * * * *